(12) United States Patent
Wagener et al.

(10) Patent No.: US 6,734,282 B1
(45) Date of Patent: May 11, 2004

(54) METHOD AND DEVICE FOR SEPARATING SOLIDS FROM POLYMER SOLUTIONS

(75) Inventors: Reinhard Wagener, Hofheim (DE); Michael Haubs, Bad Kreuznach (DE)

(73) Assignee: Ticona GmbH (DE)

( * ) Notice: Subject to any disclaimer, the term of this patent is extended or adjusted under 35 U.S.C. 154(b) by 0 days.

(21) Appl. No.: 09/958,365

(22) PCT Filed: Mar. 20, 2000

(86) PCT No.: PCT/EP00/02451
§ 371 (c)(1),
(2), (4) Date: Jan. 18, 2002

(87) PCT Pub. No.: WO00/61659
PCT Pub. Date: Oct. 19, 2000

(30) Foreign Application Priority Data

Apr. 8, 1999 (DE) .......................................... 199 15 705

(51) Int. Cl.$^7$ ................................................. C08F 6/00
(52) U.S. Cl. ........................ 528/480; 422/129; 422/131; 422/132; 422/193; 422/224; 422/233; 422/282; 528/481; 528/501; 528/503
(58) Field of Search ................................ 422/131, 132, 422/129, 193, 224, 233, 281; 528/480, 481, 501, 503

(56) References Cited

U.S. PATENT DOCUMENTS

| 4,290,998 A | * | 9/1981 | Dick et al. ................... 422/193 |
| 4,529,795 A | * | 7/1985 | Mayer et al. ............... 528/501 |
| 6,528,546 B2 | * | 3/2003 | Lee et al. ..................... 521/48 |

FOREIGN PATENT DOCUMENTS

| DE | 0241368 | 12/1986 |
| EP | 0498219 | 8/1992 |

* cited by examiner

Primary Examiner—Terressa Boykin
(74) Attorney, Agent, or Firm—Connolly Bove Lodge & Hutz LLP

(57) ABSTRACT

The present invention relates to a process for separating a dissolved polymer from solids, wherein the solid is separated off by sedimentation and the sedimented solid is washed in countercurrent with a solvent. The present invention further relates to a process for preparing polymers in a solvent, wherein a) a polymer having a low molecular weight is prepared in solution,
b) the solid which is undissolved in the reaction mixture is separated off by sedimentation and
c) the mixture which has been freed of the solid is polymerized further until a particular molecular weight has been reached.

16 Claims, 3 Drawing Sheets

Figure 3:
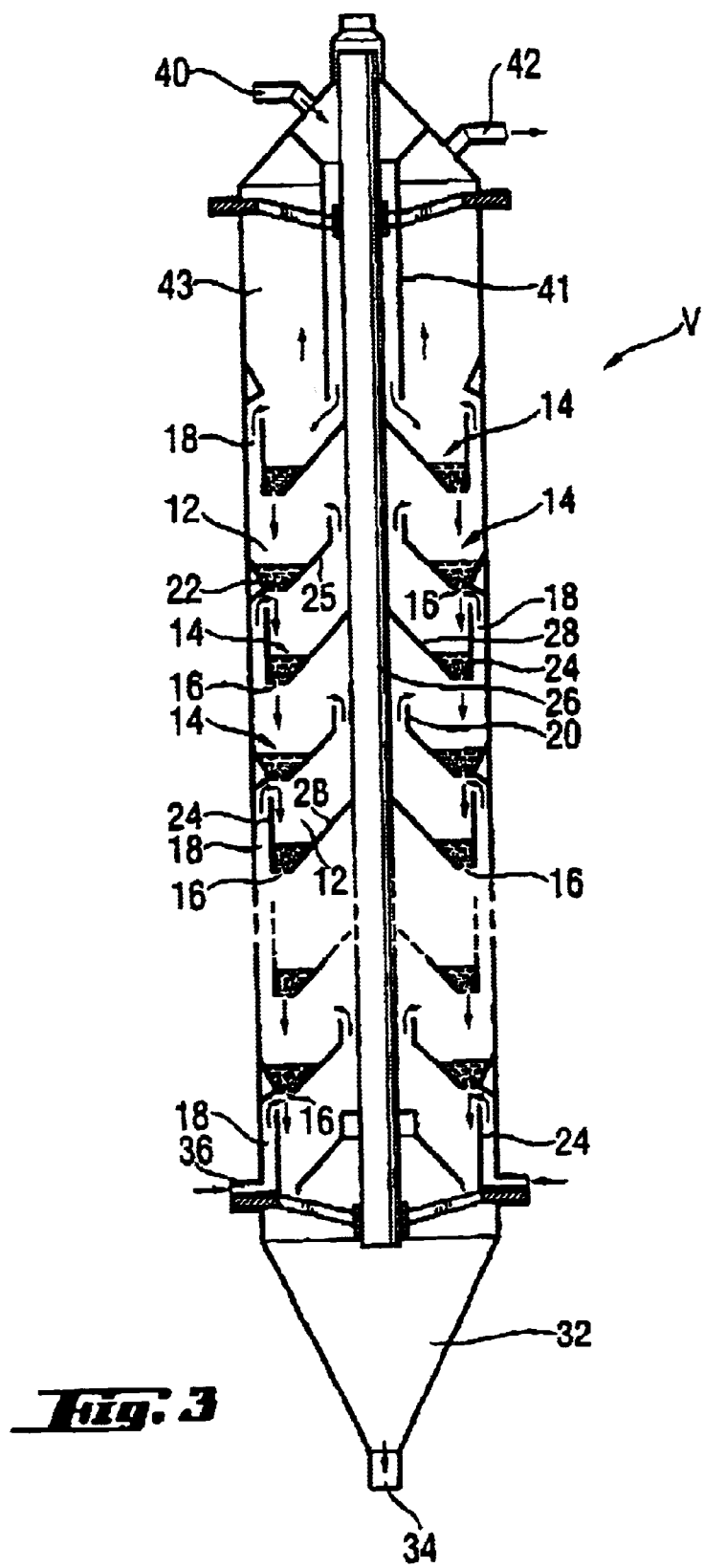

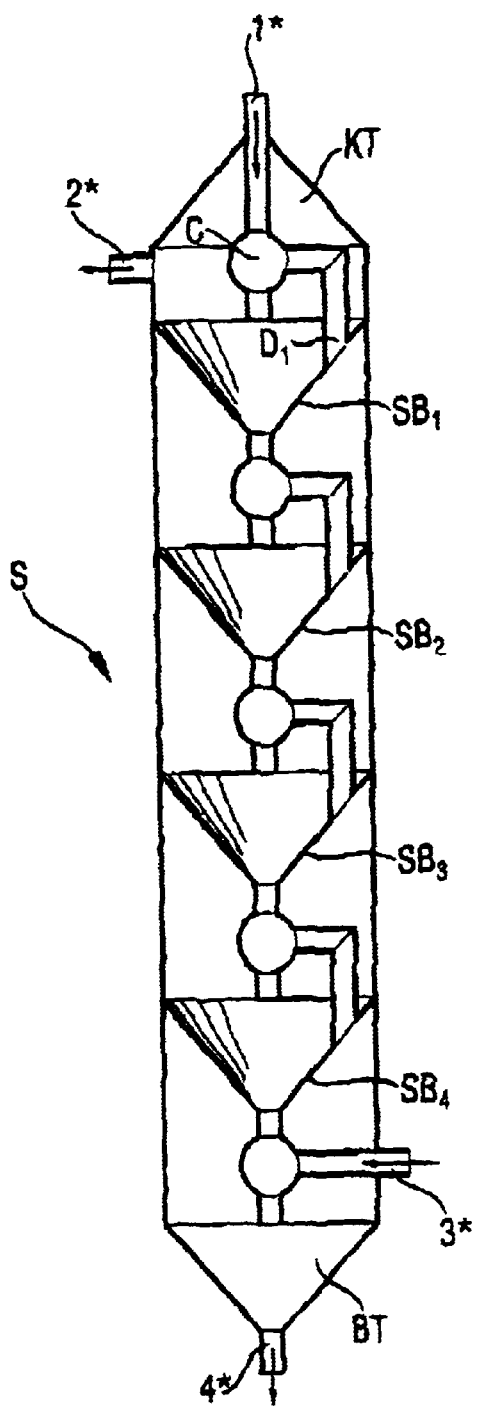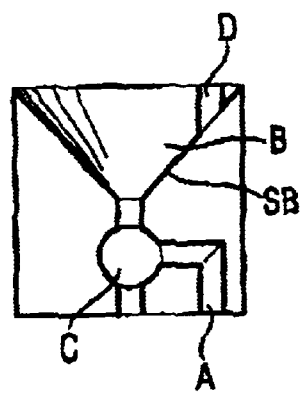
Fig. 1
Fig. 2

METHOD AND DEVICE FOR SEPARATING SOLIDS FROM POLYMER SOLUTIONS

The invention relates to a process and an apparatus for separating polymers in solution from solids which are insoluble in the solution. The invention further relates to the separation of sulfur-containing polymers from undissolved solids.

In the preparation of polymers by polycondensation, solids are frequently formed as by-products, sometimes in a subsequent neutralization reaction. This applies, for example, to the preparation of polyphenylene sulfide (PPS) from sodium sulfide and p-dichlorobenzene in a polar solvent in accordance with the simplified reaction equation:

$$Na_2S+C_6H_4Cl_2 \rightarrow [-C_6H_4-C-]+2NaCl$$

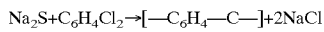

In known processes, the sodium chloride by-product which is insoluble in the reaction mixture is removed after the reaction by repeated washing with water and subsequent filtration of the polymer. However, these and related processes for other high-performance polymers such as polyaramides, poly(ether)sulfones or polyether ketones have the disadvantage that large amounts of salt-containing wastewater are obtained.

DD-A-241 368 describes an apparatus for the removal of water-soluble solids. Here, undissolved solid is separated from an epoxy resin solution by means of a combined process comprising sedimentation and dissolution of the solid in water. In operation, the apparatus disclosed has a phase boundary between the water-imiscible polymer solution at the top and the water as extractant for the solid underneath in the middle region. Separation processes using this apparatus consequently produce dilute, aqueous salt solutions.

EP-A 0 220 490 describes hot filtration or centrifugation at temperatures above 210° C. for the separation of salt from PPS and a polar solvent. However, in industrial use, this method has the disadvantage that filtration apparatuses or centrifuges for this temperature range require costly constructions. At T>210° C. and the prevailing pressures, sealing moving, in particular rapidly rotating, components presents difficulties.

WO-A-96 11 968 describes the separation of the insoluble solids from dissolved polymers in order to recover filled polymers. In the method described there, the solids, for example glass fibers, are separated from the polymer solution by filtration. However, the known processes are capable of improvement since dilute washing liquors are obtained and the removal of the solid from the filter apparatuses is difficult, particularly at high temperatures under pressure.

It is an object of the present invention to provide a process and an apparatus by means of which solids are separated from dissolved polymers and the solid discharged has been substantially freed of polymers.

The object of the present invention is achieved by a process for separating a dissolved polymer from solids, wherein the solid is separated off by sedimentation and the sedimented solid is washed in countercurrent with a solvent.

It has been found that solids can be separated from dissolved polymers by sedimentation. According to the invention, a washing process simultaneously takes place in the sedimentation apparatus, by means of which the losses of polymer caused by adhesion of polymer solution to the solid can be minimized. The sedimentation and washing sequence can be repeated in a plurality of steps or stages until a prescribed residual content of polymer in the solution adherent to the solid is achieved.

The process of the invention can also be carried out simply at high temperatures and pressures. The separation process preferably occurs continuously without dilute washing liquors being obtained. The polymer concentration in the overflow from the sedimentation apparatus is greater than 50%, preferably greater than 70%, of the concentration at the inlet.

In the present context, the term polymer includes all macromolecular, predominantly organic compounds which dissolve in a solvent, if appropriate at elevated temperature under pressure.

The process of the invention is particularly suitable for polymers in whose preparation solids, for example salts, are formed as by-products and have to be separated off. The solids can be formed directly in the polycondensation process or in a subsequent neutralization of acids or bases. Examples of such processes are the preparation of polyaramides from diamines and diacid chlorides, of polycarbonates from diphenols or diphenoxides and phosgene, of polysulfones, polyether sulfones or polyether ketones from diphenoxides and dihalogenated aromatic hydrocarbons or the preparation of polyarylenesiloxanes from diaryldichlorosilanes and diphenoxides.

The process of the invention is of particular relevance for polymers which dissolve only at elevated temperature under pressure and in the case of which the removal of the solids therefore requires costly apparatus. Such polymers include, in particular, sulfur-containing polymers.

Sulfur-containing polymers are polymers comprising arylene sulfide units. The arylene constituents of the arylene sulfide units comprise monocyclic or polycyclic aromatics or linked aromatics. The aromatics can also contain heteroatoms. Examples of such aromatics, which may be substituted or unsubstituted, are benzene, pyridine, biphenyl, naphthalene, phenanthrene. Examples of substituents are $C_1$–$C_6$-alkyl, $C_1$–$C_6$-alkoxy, carboxyl, amino and sulfonic acid groups. Linked aromatics are, for example, biphenyl or aromatics joined by other bridges (arylene ethers).

Preferred sulfur-containing polymers are polyarylene sulfides, in particular polyphenylene sulfide.

Possible solids are all substances which, under the conditions under which the sedimentation apparatus is operated, are present in solid form and have a density different from the liquid mixture. Examples are salts, substances used as fillers, e.g. glass fibers, carbon fibers, titanium dioxide, gypsum or other solids.

Salts can be organic or inorganic, i.e. can consist of any combination of organic or inorganic cations with organic or inorganic anions. They have to be at least partially insoluble in the reaction medium and have a density different from that of the liquid reaction mixture. Typical representatives of the inorganic salts are the halides of alkali or alkaline earth metals which are frequently formed as by-product of a polycondensation. Typical representatives of organic salts are carboxylates of the alkali metals, of the alkaline earth metals, of ammonium or of organically substituted ammonium cations which are, according to the prior art, used as promoters in, for example, the preparation of sulfur-containing polymers. For the purposes of the present invention, carboxylates are the solids of aliphatic carboxylic acids, e.g. acetic acid or propionic acid, or aromatic carboxylic acids, for example benzoic acid, and also solids of polyfunctional carboxylic acids.

Apparatuses suitable for separating off the undissolved solids are ones which allow the solid which has been separated off to be washed with solvents. The separation is preferably carried out using an apparatus which makes it possible for the solid to be separated off to be washed in countercurrent in a number of stages and which can also be used at elevated pressures and temperatures and which allows effective washing of the solid to be separated off with small amounts of solvent, so that no highly dilute polymer solutions are formed. These objectives can be achieved by means of the sedimentation apparatuses described below.

The polymer concentration of the mixture to be separated is preferably up to 70% by weight. Particular preference is given to 10–50% by weight. The polymer concentration in the liquid discharged together with the solid is from 0% to 70% of the concentration at the inlet, preferably from 0% to 10% and particularly preferably from 0% to 5%.

The sedimentation of the insoluble solid occurs at temperatures at which the polymers are liquid or in dissolved form. In the case of high-performance polymers which often dissolve only at elevated temperatures, the sedimentation apparatuses are operated at elevated temperatures and pressures. The temperatures are preferably in the range from 50° C. to 300° C. and the pressures are preferably in the range from 0 bar to 50 bar.

Materials of construction which are particularly suitable for the sedimentation apparatus are stainless steel, titanium or zirconium or other materials which are mechanically stable and are not subject to corrosive attack under the operating conditions.

The effectiveness of the solids removal by sedimentation depends on the particle size and particle size distribution of the undissolved solid, on the viscosity of the polymer solution and on the density difference between solid and liquid phase.

The mixture to be separated can be the reaction mixture of a polymerization which contains an undissolved solid. Since the viscosity increases with increasing conversion in the polymerization reaction and the particle size of the solid decreases during mixing of the reaction solution, it may be advantageous to carry out the removal of the solid by sedimentation before the final molecular weight has been reached. For this reason, a preferred embodiment of the invention provides for the solid to be separated from the reaction mixture before the desired molecular weight has been reached.

According to the invention, preference is given to a process for preparing polymers in a solvent, wherein
 a) a polymer having a low molecular weight is prepared in solution,
 b) the solid which is undissolved in the reaction mixture is separated off by sedimentation and washed and
 c) the mixture which has been freed of the solid is polymerized further until a particular molecular weight has been reached.

The mean molar mass of the polymers, expressed by the weight average $M_w$, of the step a) is in the range from 500 g/mol to 30,000 g/mol, preferably from 1000 g/mol to 20,000 g/mol and particularly preferably from 2000 g/mol to 15,000 g/mol.

At the end of step a), the solid is separated off by sedimentation and, for example, washed with solvents. The separation is carried out at a temperature at which the polymer is present in liquid or dissolved form in the reaction mixture. In general, these temperatures are from 50° C. to 300° C. The solid does not always have to be separated off completely in step b), since small amounts of solid often do not interfere appreciably in the polymerization in step c). The solid is typically separated off to an extent of from 50% to 100%, preferably from 90% to 99.9%.

The reaction mixture which has been freed of the solid is then polymerized further in step c). The molecular weights of the polymers after step c) are above those after step a) and are from 1000 g/mol to 500,000 g/mol, preferably from 2000 g/mol to 300,000 g/mol and particularly preferably from 3000 g/mol to 100,000 g/mol.

It is also possible to increase the concentration of the polymers prior to step c) by concentrating the clear solution from the sedimentation apparatus by evaporation of solvents and other volatile components. It has been found to be advantageous to concentrate the solution to a polymer content of from 20 to 70 percent by weight, preferably from 30 to 60 percent by weight.

In addition, up to 20 mol percent, preferably from 0.5 to 5 mol percent, based on the amount used in step a), of one or more monomers can be added between steps b) and c) in order to ensure a very precise stoichiometric equivalence between the monomers in the case of a copolymerization, a polycondensation or a polyaddition. Finally, volatile components can be removed from the mixture by passing steam through it in order to remove undesirable constituents.

The separation process of the invention will be described using the separation of undissolved sodium chloride from polyphenylene sulfide (PPS) dissolved in N-methylpyrrolidone as an example, without being restricted thereto.

A suspension of sodium chloride in a homogeneous solution of PPS in NMP is obtained by reacting para-dichlorobenzene (DCB) with sodium sulfide hydrate in NMP at from 180° C. to 280° C. in accordance with the prior art. In a preferred embodiment of the invention, the reaction is carried out at from 220° C. to 250° C. in a continuous stirred tank, a cascade of stirred tanks or a combination of stirred tanks and a flow tube reactor. The monomers and the solvent are introduced continuously into the reaction system and the reaction mixture is likewise discharged continuously from the reaction system.

The conversion of the monomers sodium sulfide and DCB in the reaction mixture discharged is above 50%. The reaction mixture comprises, as main constituents, solvent, homogeneously dissolved PPS and insoluble sodium chloride. Secondary constituents which may be present in the solution are unreacted monomers, water and reaction promoters known from the prior art. Known promoters of this type are, inter alia, the acetates or halides of alkali metals or alkaline earth metals, for example lithium chloride or sodium acetate. Under conditions typical for the industrial preparation of PPS, the molar ratio of NMP to sulfide is from 1 to 10, preferably from 2 to 5. The proportion by volume of the sodium chloride in the reaction mixture is V(solid)/V(total)=0.05–0.25, preferably 0.1–0.2.

The reaction mixture is fed to the sedimentation apparatus under the action of gravity, a pressure difference or by means of a pump. It is operated at a temperature of from 180° C. to 280° C., preferably from 220° C. to 250° C. The operating pressure of the sedimentation vessel is determined by the vapor pressure of the reaction mixture at the operating temperature. It is from 0 to 15 bar gauge pressure, preferably from 1 to 5 bar gauge pressure.

The separation of the solid from the reaction mixture in step b) is carried out at a reaction conversion based on the aromatic dihalo compound of from 50% to 98%, preferably from 50% to 96%, particularly preferably at from 60% to 94%.

During the reaction in step a), it is usual for chemically bound water of hydration to be liberated. It can be advantageous for the sedimentation in step b) to remove all or some of the water of reaction. If desired, the contents of the reactor can be neutralized or made slightly acidic by addition of acids prior to removal of the solid. Examples of suitable acids are acetic acid, hydrochloric acid and carbon dioxide.

If the mixture to be separated is close to its boiling point, it can be cooled somewhat or diluted with solvents before it enters the sedimentation apparatus in order to avoid formation of bubbles of vapor in the sedimentation apparatus.

The sedimentation residue is advantageously washed with solvents to remove adhering residues of mother liquor. The washing process preferably takes place in the sedimentation apparatus itself. The solid discharged with solvents is dried in order to recover adhering solvent residues. As a result of this separation operation, sodium chloride is obtained as solid and the polymer is obtained as a solution in the overflow from the sedimentation apparatus.

It is also possible to remove all or part of the excess dihalo compound prior to step c). This can be achieved, for example, by feeding the overflow from the sedimentation apparatus to the top of a multistage column which is superposed on a vaporizer. The concentrated polymer solution which has been largely freed of dihalo compound is taken off from the vaporizer. Part of the solvent is vaporized in the vaporizer and the solvent vapor passes in countercurrent through the column, as a result of which compounds which are more volatile than the solvent are removed.

The reaction conditions for the further polymerization in step c) can be varied within wide limits. Thus, the reaction temperatures can be from 180° C. to 290° C., preferably from 230° C. to 270° C. The reaction times can be from 10 minutes to 10 hours, preferably from 20 minutes to 2 hours. In the continuation of the polymerization in step c), it is possible, if desired, to employ additional measures which lead, according to the prior art, to achievement of very high molar masses. These include, for example, the addition of promoters. Examples of known promoters of this type are alkali metal salts and alkaline earth metal salts of lower carboxylic acids, in particular sodium acetate. It is likewise possible to add defined amounts of water in step c) in order to carry out the further polymerization in a two-phase reaction system, as described in the prior art. Finally, further additives such as acids, e.g. acetic acid or hydrogen sulfide or carbon dioxide, can be added to adjust the base strength of the system.

Various methods are available for isolating the polymer. The polymer can be separated off by, for example, crystallization and subsequent simple pressure filtration. However, it is also possible to use other methods of separating solids from liquids, for example centrifugation or decantation. The resulting suspension can also be worked up in a depressurization vaporization or by spray drying. Here, solvents and further low molecular weight substances as main constituents are taken off in vapor form and the polymer is obtained as a largely dry solid. A further possibility is evaporation of the polymer solution until a polymer melt is obtained.

The invention further provides an apparatus for separating at least one dissolved polymer from solids using at least one sedimentation apparatus, wherein the solid is separated off by sedimentation and the sedimented solid is washed in countercurrent with a solvent. Very good results are achieved using at least one sedimentation apparatus. The apparatus of the invention is suitable for separating sulfide-containing polymers, in particular polyphenylene sulfide, from solids.

The invention accordingly provides an apparatus for preparing at least one polymer in a solvent, wherein a) a polymer having a low molecular weight is prepared in solution, b) the solid which is undissolved in the reaction mixture is separated off in an apparatus comprising at least one sedimentation apparatus and c) the mixture which has been freed of the solid is polymerized further until a particular molecular weight has been reached.

Very good results are achieved by means of the apparatus, particularly in the case of sulfur-containing polymers, in particular in the case of polyphenylene sulfide.

The process of the invention is illustrated below with the aid of a drawing and examples.

DRAWING

The drawing consists of FIGS. 1 to 4.

Figure 4:
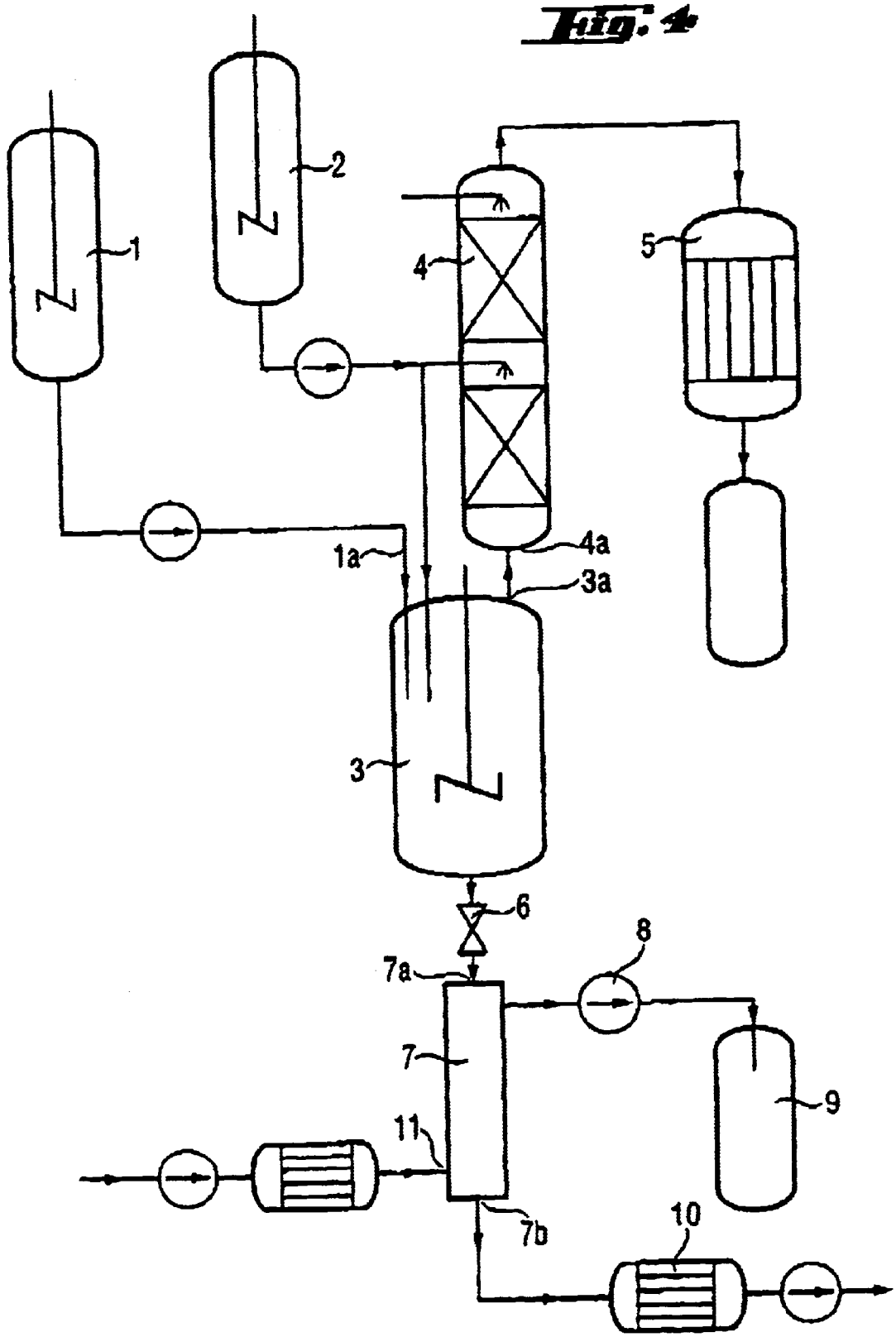

FIG. 1 shows, by way of example, an embodiment of the sedimentation apparatus for carrying out the process of the invention, FIG. 2 shows part of the sedimentation apparatus of FIG. 1, FIG. 3 shows a further embodiment of a sedimentation apparatus, FIG. 4 shows a plant for preparing polymers and for separating solids from polymer solutions.

DESCRIPTION OF FIGS. 1 AND 2

The bottom section (BT) of the sedimentation apparatus (S) of FIG. 1 has a funnel shape and ends in an outflow which simultaneously represents the solids outlet (4*) of the sedimentation apparatus (S). The top section (KT) has an inlet for the solid/iliquid mixture (1*) which is connected to a mixing chamber (C). The top section (KT) also has an outlet (2*) for the supernatant liquid in the sedimentation apparatus (S). The sedimentation apparatus (S) contains four sedimentation trays ($SB_1$, $SB_2$, $SB_3$ and $SB_4$ from the top downward).

A sedimentation tray (SB) as shown in FIG. 2 comprises a sedimentation funnel (B), a mixing chamber (C) and a supernatant liquid return (D). In the mixing chamber (C), the washing liquid from the washing liquid inlet (A) and the sediment flowing down from the sedimentation funnel (B) are combined and mixed. The washing liquid inlet (A) and the supernatant liquid return (D) are connected to one another. The supernatant liquid return (D) of one sedimentation tray ($SB_n$) is connected to the washing liquid inlet (A) of the sedimentation tray located above it ($SB_{n-}$). The line (3*) for the washing liquid inlet (A) of the bottom sedimentation tray ($SB_4$) leads outside. The washing liquid is fed to the sedimentation apparatus (S) through this line. The supernatant liquid return (D1) of the uppermost sedimentation tray ($SB_1$) is connected to the mixing chamber (C) of the top section.

The apparatus comprises at least one sedimentation apparatus, with one sedimentation apparatus having n sedimentation trays, where n is an integer>1. The apparatus comprises at least one top section (KT), at least one bottom section (BT) and n sedimentation trays between these.

DESCRIPTION OF FIG. 3

An elongated vessel V comprises a plurality of sedimentation chambers 12. The vessel V can have various lengths. In the schematic depiction here, the vessel V is not shown in full, as indicated by the broken lines. The individual sedimentation chambers 12 have trays 14 and are bounded or divided by ring-shaped wall elements 22, 24, 25, 28. When a material comprising a first component and a second component which are to be separated is introduced into the vessel V through an opening 40, this passes through a central inlet tube 41 and into the uppermost sedimentation chamber 12 and sediments under the action of gravity. This results in formation of a heavy phase comprising the one component which forms a sediment and a light phase which comprises a washing fluid and the other component and flows upward. The sediment collects in the funnel-shaped sedimentation chamber 12 and flows through an opening 16 configured as an annular slot into the tray 14. The respective sedimentation chamber 12 is formed and laterally bounded by ring-shaped wall elements 24, 28 or 22, 25. The slot-shaped opening 16 results in formation of a relatively thin sediment film which spreads in the direction of gravity. The sediment film subsequently flows into the next sedimentation chamber 12, so that the formation of a sediment film can be repeated sequentially.

The underside of the vessel V is provided with a ring-shaped inlet 36 for a washing fluid. The washing fluid is passed from the bottom upward through the vessel V, so that it flows in countercurrent to the material to be separated. A suitable flow device results in the washing fluid flowing transversely onto the sediment film directed downward on the trays 14 through the openings 16 so that it flows through the sediment film and at least partial displacement of the second component from the sediment film occurs. The flow behavior is depicted by means of arrows.

In the vessel V, a support 26 is mounted centrally so as to be axially movable and rotatable; this can be driven from above by a motor which is not shown. The support is provided with radially internal wall elements 25, 28. These wall elements 25, 28 together with further wall elements 22, 24 located in the vessel V influence the flow behavior of the substances passed through the vessel V. In particular, a cylindrical, radially external wall element 24 together with the vessel V forms an outer channel 18 for the washing fluid, while an internal channel 20 of the adjoining sedimentation chambers 12 is formed by a radially internal wall element 25 and the tubular support 26. The sedimentation chambers 12 which are arranged in a column-like fashion alternately have the outer channel 18 and the inner channel 20 so as to produce a meandering, as seen in cross section, flow of the washing fluid. To aid transport of the sediment to the opening 16 in the sedimentation chambers 12, the wall elements 22, 25, 28 have conical regions.

The washing fluid conveyed through an outer channel 18 flows from the outside radially inward and impinges transversely onto a sediment film which flows out of the annular opening 16 of a tray 14 in a direction essentially parallel to the central axis. It flows essentially through the sediment film so that at least one component is at least partially displaced. The washing fluid subsequently flows essentially along the underside of the tray 14 through the inner channel 20 to the sedimentation chambers 12 located above it. After it leaves the inner channel 20, a transverse flow is again established and results in the washing fluid now flowing from inside radially outward through the ring-shaped sediment film of the sedimentation chamber 12 located above it. After passing through the uppermost outer channel 18, the washing fluid together with the component which has been washed out flows into a calming zone 43 in which final sedimentation can take place. From this calming zone 43, the washing fluid which is enriched with at least one component is discharged via an outlet 42.

The lower region 32 of the vessel V has a conical shape. To take off the component which has arrived in the lower region, an opening 34 is provided in the conical section 32 of the vessel.

These apparatuses as shown in FIGS. 1 to 3 also allow the process to be carried out fully continuously since both the discharge of the solid and the washing process for removing residues of mother liquor can be made fully continuous.

EXAMPLES

Example 1

A plant as shown in FIG. 4 was used for carrying out Example 1. 38.5 ; kg of sodium sulfide (61%, 301 mol) and 25 kg of NMP (253 mol) were placed in a 100 l stirred vessel (2) made of stainless steel. The mixture was made inert by means of nitrogen and heated while stirring. The molar ratio of sulfide NMP in the first reaction vessel (2) was 1.19 (S/NMP). At from 150° C. to 170° C., a homogeneous solution of the sulfide in NMP was formed. 48 kg of DCB (327 mol) and 16 kg of NMP were placed in a heated reservoir (1). 55 kg of NMP were placed in a 200 l titanium stirred tank reactor (3) and heated while stirring to 210° C. At this temperature, a pumping of the DCB/NMP solution directly via an immersed tube (1a) into the reactor (3) was commenced. The solution of sulfide and NMP was pumped from the first stainless steel reaction vessel (2) into the top of a titanium column (4). The titanium column (4) was provided with packing made of profiled titanium sheets. The bottom (4a) of the column (4) was opened and flanged directly onto the domed top (3a) of the titanium reactor (3). By means of a pressure maintenance valve, the pressure in the reactor (3) and the washing column (4) was kept constant at 4 bar absolute. The reactor (3) was heated further and the reactor temperature was finally kept constant at 234° C. The vapor mixture leaving the reactor was condensed in the condenser (5). The condensate was demixed into a lower DCB-rich phase and an upper water-rich phase. The heavy phase was pumped back into the titanium reactor (3). The light upper phase of the condensed vapor mixture was weighed and analyzed after the end of the experiment. It contained 12.2 kg of water and 6.2 kg of NMP.

The addition of the monomers was complete after 2 hours. The molar ratio of NMP to sulfide used in the second reaction vessel (3) was 3.22; this corresponds to a polymer concentration of 25 percent by weight in NMP. The solution was stirred for another 1 hour at 234° C. Subsequently, the bottom valve (6) was opened so as to pass the reaction mixture to a sedimentation apparatus having a diameter of 125 mm as shown in FIG. 1.

The inlet (7a) of the sedimentation apparatus was connected via a descending tube to the bottom valve (6) of the reactor (3). The overflow from the sedimentation apparatus was pumped at a rate of 70 l/h into a collection vessel (9) by means of a pump (8). At the bottom (7b) of the sedimentation apparatus, the salt/NMP mixture was pumped out via a cooler (10) in such a way that the bottom section at the lower end of the sedimentation apparatus (7) remained about 70% full of salt. NMP heated to 230° C. was pumped under pressure into the solvent inlet (11) at the same volumetric flow rate at which the salt/NMP mixture was pumped out.

The entire contents of the reactor were fed to the sedimentation apparatus (7). The sedimentation apparatus (7) was then rinsed with 5 liters of NMP via the solvent inlet (11). The reaction mixture was subsequently cooled in the collection vessel (9). The polymer concentration in the collection vessel (9) was more than 20% by weight. The prepolymer was precipitated in the collection vessel (9) and the collection vessel (9) was emptied at 80° C. onto a suction filter. The solid was filtered off from the mother liquor, washed with water and dried. The yield of prepolymer was 30.8 kg (95% of theory).

What is claimed is:

1. A process for separating at least one dissolved polymer from at least one solid, wherein the solid is separated off by sedimentation and the sedimented solid is washed in countercurrent with a solvent.

2. A process as claimed in claim 1, wherein the sequence of sedimentation and washing is repeated in a plurality of steps or stages.

3. A process as claimed in claim 1, wherein the polymer concentration in the liquid discharged with the solid is less than 10% of the concentration at the inlet.

4. A process as claimed in claim 1, wherein the sedimentation of the insoluble solid occurs at temperatures of from 50° C. to 300° C. and pressures of from 0 bar to 50 bar.

5. A process as claimed in claim 1, wherein the polymer concentration in the overflow from the sedimentation apparatus is greater than 50% of the concentration at the inlet.

6. A process as claimed in claim 1, wherein the separation is carried out in an apparatus comprising at least one sedimentation apparatus.

7. A process for preparing polymers in a solvent, wherein
   a) a polymer having a low molecular weight is prepared,
   b) the solid which is undissolved in the reaction mixture is separated off by sedimentation and
   c) the mixture which as been freed of the solid is polymerized further until a particular molecular weight has been reached.

8. A process as claimed in claim 7, wherein the molecular weight of the polymer in step a) is in the range from 500 g/mol to 30,000 g/mol.

9. A process as claimed in claim 8, wherein the polymer is a sulfur-containing polymer.

10. A process as claimed in claim 9, wherein the polymer is polyphenylene sulfide.

11. A process as claimed in claim 10, wherein the solid is separated from the reaction mixture in step b) at a reaction conversion based on one of the monomers of from 50% to 98%.

12. An apparatus for separating at least one polymer in a solution from a solid, wherein the solid is separated off by sedimentation and the sedimented solid is washed in countercurrent with a solvent.

13. An apparatus as claimed in claim 12, wherein the polymer is a sulfur-containing polymer, in particular polyphenylene sulfide.

14. An apparatus for preparing at least one polymer in a solvent, wherein
   d) a polymer having a low molecular weight is prepared,
   e) the solid which is undissolved in the reaction mixture is separated off in an apparatus comprising at least one sedimentation apparatus and
   f) the mixture which has been freed of the solid is polymerized further until a particular molecular weight has been reached.

15. An apparatus as claimed in claim 14, wherein the polymer is a sulfur-containing polymer.

16. An apparatus comprising at least one sedimentation apparatus for separating at least one dissolved polymer from at least one solid, wherein the solid is separated off by sedimentation and the sedimented solid is washed in countercurrent with a solvent.

* * * * *